(12) United States Patent
He

(10) Patent No.: US 12,157,057 B2
(45) Date of Patent: Dec. 3, 2024

(54) METHOD, APPARATUS, AND DEVICE FOR CORRECTING POSITION OF TARGET OBJECT, AND MEDIUM

(71) Applicant: TENCENT TECHNOLOGY (SHENZHEN) COMPANY LIMITED, Guangdong (CN)

(72) Inventor: Huan He, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 408 days.

(21) Appl. No.: 17/665,151

(22) Filed: Feb. 4, 2022

(65) Prior Publication Data
US 2022/0152507 A1    May 19, 2022

Related U.S. Application Data

(63) Continuation of application No. PCT/CN2020/128242, filed on Nov. 12, 2020.

(30) Foreign Application Priority Data

Jan. 17, 2020    (CN) .......................... 202010055345.2

(51) Int. Cl.
*A63F 13/56*    (2014.01)
*A63F 13/35*    (2014.01)
(Continued)

(52) U.S. Cl.
CPC .............. *A63F 13/56* (2014.09); *A63F 13/35* (2014.09); *G06T 7/20* (2013.01); *G06T 7/70* (2017.01)

(58) Field of Classification Search
CPC . A63F 13/56; A63F 13/35; G06T 7/70; G06T 7/20
See application file for complete search history.

(56) References Cited

U.S. PATENT DOCUMENTS 10,209,771 B2 * 2/2019 Tokubo ................. A63F 13/327
10,348,983 B2 * 7/2019 Ogasawara ............. G06T 7/136
(Continued)

FOREIGN PATENT DOCUMENTS

CN    104954349 A    9/2015
CN    109381858 A    2/2019
(Continued)

OTHER PUBLICATIONS

International Search Report dated Feb. 10, 2021 issued in corresponding application PCT/CN2020/128242 (with English translation).

*Primary Examiner* — Qun Shen
(74) *Attorney, Agent, or Firm* — ArentFox Schiff LLP

(57) ABSTRACT

A method for correcting a position of a target object is provided. In the method, a position correction process for the target object is determined according to at least one of an update time window of a server, a motion state of the target object, or a position deviation of the target object, the position deviation being a difference between a first position of the target object in the server and a second position of the target object in a client, and the position correction process moving the target object from the second position to the first position. The position correction process is executed during the update time window to move the target object from the second position to the first position. Apparatus and non-transitory computer-readable storage medium counterpart embodiments are also contemplated.

20 Claims, 6 Drawing Sheets

(51) Int. Cl.
*G06T 7/20* (2017.01)
*G06T 7/70* (2017.01)

(56) References Cited

U.S. PATENT DOCUMENTS

| | | | |
|---|---|---|---|
| 10,948,299 B1* | 3/2021 | Zhang | G01C 21/1656 |
| 2002/0154070 A1* | 10/2002 | Sato | H04N 5/222 |
| | | | 348/E5.022 |
| 2004/0006424 A1* | 1/2004 | Joyce | H04N 23/695 |
| | | | 342/357.22 |
| 2010/0057939 A1* | 3/2010 | Zhang | H04L 67/60 |
| | | | 709/248 |
| 2010/0323783 A1* | 12/2010 | Nonaka | A63F 13/211 |
| | | | 463/43 |
| 2013/0097632 A1* | 4/2013 | Shah | H04N 21/2408 |
| | | | 725/32 |
| 2018/0310020 A1* | 10/2018 | Kopietz | H04N 19/126 |
| 2019/0158340 A1* | 5/2019 | Zhang | H04B 17/318 |
| 2019/0178980 A1* | 6/2019 | Zhang | A61B 5/7267 |
| 2019/0195317 A1 | 9/2019 | Baillie | |
| 2020/0037029 A1* | 1/2020 | He | H04N 21/6587 |
| 2021/0093966 A1* | 4/2021 | Cerny | A63F 13/44 |

FOREIGN PATENT DOCUMENTS

| | | |
|---|---|---|
| CN | 110022363 A | 7/2019 |
| CN | 111265863 A | 6/2020 |

\* cited by examiner

METHOD, APPARATUS, AND DEVICE FOR CORRECTING POSITION OF TARGET OBJECT, AND MEDIUM

RELATED APPLICATIONS

This application is a continuation of International Application No. PCT/CN2020/128242, entitled "METHOD, APPARATUS, AND DEVICE FOR CORRECTING POSITION OF TARGET OBJECT, AND MEDIUM" and filed on Nov. 12, 2020, which claims priority to Chinese Patent Application No. 202010055345.2, entitled "METHOD, APPARATUS, AND DEVICE FOR CORRECTING POSITION OF TARGET OBJECT, AND MEDIUM", filed on Jan. 17, 2020. The entire disclosures of the prior applications are hereby incorporated by reference in their entirety.

FIELD OF THE TECHNOLOGY

This application relates to the field of electronic technologies, including to position correction.

BACKGROUND OF THE DISCLOSURE

In a network game process, for example, a multiplayer online battle arena (MOBA) or a real-time strategy game (RTS), multiple users separately connect to a server by using respective clients, so as to implement a multiplayer online game. In this process, the server needs to ensure that a non-player-character (NPC) in the game maintains synchronization among all clients.

However, because a quantity of server-related information is relatively large and a bandwidth is relatively small, all position information cannot be transmitted to the clients in each frame. The NPC of the client needs to continue to move in an interval between two pieces of server information (that is, an update time window period) under prediction by the client, so that the player feels that the entire game is coherent and smooth. However, an error inevitably occurs in prediction, an exception may occur in a next update of the server. For example, the NPC finds a target or a route again. In addition, there is also a delay and an error in data transmission. Therefore, it is a frequent case that a position predicted by the client is different from an actual position on the server. When next data transmission of the server arrives, if an actual state of the server of the NPC is inconsistent with a current state of the NPC in the client, the client performs a position correction operation, so that the position of the NPC is restored to a new known correct position.

Currently, when the client performs a position correction operation, when such as a large error occurs, for example, when a position sending interval of the server is relatively large, the position correction operation may show a feeling of obvious stalling or even teleportation, causing display of a game picture to not be smooth, and stability of the NPC to be reduced. The player experience can be greatly affected.

SUMMARY

In order to solve the above problems, the technical solutions adopted by this disclosure include the following aspects.

A method for correcting a position of a target object is provided. In the method, a position correction process for the target object is determined by processing circuitry of a client according to at least one of an update time window of a server, a motion state of the target object, or a position deviation of the target object, the position deviation being a difference between a first position of the target object in the server and a second position of the target object in the client, and the position correction process moving the target object from the second position to the first position. The position correction process is executed during the update time window to move the target object from the second position to the first position.

An apparatus including processing circuitry is provided. The processing circuitry configured to determine a position correction process for a target object according to at least one of an update time window of a server, a motion state of the target object, or a position deviation of the target object, the position deviation being a difference between a first position of the target object in the server and a second position of the target object in a client of the apparatus, and the position correction process moving the target object from the second position to the first position. The processing circuitry is further configured to execute the position correction process during the update time window to move the target object from the second position to the first position.

A computer device, including an interaction apparatus, an input/output (I/O) interface, a processor, and a memory, the memory storing a program instruction; the interaction apparatus being configured to acquire an operation instruction entered by a user; and the processor being configured to execute the program instruction stored in the memory, and perform the method according to any one of the foregoing implementations.

A non-transitory computer readable storage medium including instructions which when executed by a processor cause the processor to perform the method according to any one of the implementations.

A computer program product, when executed, performing the method according to any one of the foregoing implementations.

A method for correcting a position of a target object provided in embodiments includes: acquiring an update time window period of the target object, the update time window period being a time interval for interaction between a client and a server; acquiring a correction policy of the target object according to at least one of the update time window period, a motion parameter of the target object, and a position deviation of the target object, the motion parameter being a parameter used for describing a motion state of the target object, the position deviation being a difference between a first position of the target object in the server and a second position of the target object in the client, and the correction policy being used for moving the target object from the second position to the first position; and executing the correction policy during the update time window period, so that the target object moves from the second position to the first position. When a correction policy is set, a state of a target object is considered, so that a correction policy that matches the state of the target object is specified, a stalling phenomenon of the target object in a position correction process is prevented, and picture smoothness is improved.

BRIEF DESCRIPTION OF THE DRAWINGS

To describe the technical solutions in the embodiments of this disclosure more clearly, the following briefly describes the accompanying drawings for describing the embodiments. The accompanying drawings in the following description show merely exemplary embodiments of this disclosure, and a person of ordinary skill in the art may still derive other drawings from these accompanying drawings.

DESCRIPTION OF EMBODIMENTS

Figure 1:
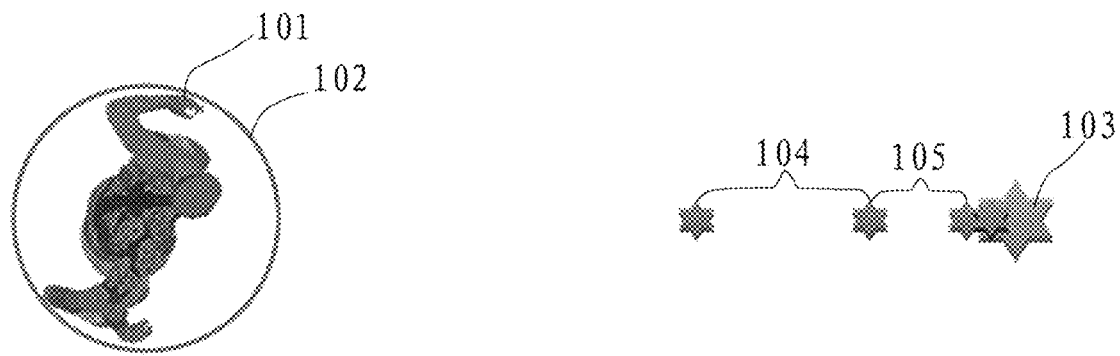
FIG. 1 is a schematic diagram of a related position correction according to this disclosure.

The technical solutions in the embodiments of this disclosure will be described below with reference to the accompanying drawings in the embodiments of this disclosure. The described embodiments are a part of this disclosure, but not all of them. Based on the embodiments of this disclosure, all other embodiments obtained by those of ordinary skill in the art shall fall within the protection scope of this disclosure. Examples of the embodiments are shown in the accompanying drawings, where the same or similar reference numerals indicate the same or similar elements or elements having the same or similar functions.

In the specification, claims, and accompanying drawings of this disclosure, the terms "first", "second", "third", "fourth", and so on (if existing) are intended to distinguish between similar objects rather than describe a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In a network game process, for example, a multiplayer online battle arena (MOBA) or a real-time strategy game (RTS), multiple users separately connect to a server by using respective clients, so as to implement a multiplayer online game. In this process, the server needs to ensure that a non-player-character (NPC) in the game maintains synchronization among a plurality of clients, such as all clients.

However, because a quantity of server-related information is relatively large and a bandwidth is relatively small, all position information cannot be transmitted to the clients in each frame. The NPC of the client needs to continue to move in an interval between two pieces of server information (that is, an update time window period) under prediction by the client, so that the player feels that the entire game is coherent and smooth. However, an error inevitably occurs in prediction, an exception may occur in a next update of the server. For example, the NPC finds a target or a route again. In addition, there is also a delay and an error in data transmission. Therefore, it is a frequent case that a position predicted by the client is different from an actual position on the server. When next data transmission of the server arrives, if an actual state of the server of the NPC is inconsistent with a current state of the NPC in the client, the client performs a position correction operation, so that the position of the NPC is restored to a new known correct position.

Currently, when the client performs a position correction operation, once a case such as a large error occurs, for example, when a position sending interval of the server is relatively large, the position correction operation may show a feeling of obvious stalling or even teleportation, causing that display of a game picture to not be smooth, and stability of the NPC to be reduced. The player experience can be greatly affected.

For example, in a current position correction solution, when each frame is updated on a client, an error is gradually reduced according to a constant ratio until the error is below a threshold, and the error is changed to 0. The constant ratio usually is about 70%, and the threshold is about 0.2. For example, if a position of a unit on the client in a frame is $X=10.0$ and it is determined according to a message received from the server that the position needs to be $X=16.0$, the error is 6.0. In a next update, the correction solution reduces the error by 70%, that is, becomes $6.0-6.0*70\%=1.8$, so that the position in the client becomes $X=16.0-1.8=14.2$. In a further next frame, the error is reduced by 70% to 0.54, and the position is changed to $X=15.46$. In a still further next frame, the error is 0.162, and the position changes to $X=15.838$. In a yet still further next frame, because the error is less than 0.2, the error is cleared, and the position is directly changed to $X=16$.

It can be understood that in the foregoing example, the common correction solution is updated four times, so that the error becomes 0. As shown in FIG. 1, in a process in which an NPC 101 moves from a first position 102 to a second position 103, a correction amplitude 104 in previous several times is relatively large, and a correction amplitude 105 in subsequent several times is relatively small. A "lag" feeling can be found when viewing carefully. If the parameter is reduced by 70%, the "lag" feeling will be reduced, but at the same time, a quantity of frames for correction will be increased. Even if information to be corrected appears again, the error may become larger instantaneously. Therefore, it is difficult for the current correction solution to smoothly represent the position correction process of the NPC.

To resolve the foregoing problem, an embodiment of this disclosure provides a method for correcting a position of a target object, so that a correction policy such as a position correction process of the target object can be acquired according to at least one of an update time window period, a motion parameter of the target object, and a position deviation of the target object, and a position of the target object is smoothly corrected by using the correction policy, so as to prevent obvious stalling or even teleportation on the target object in the position correction process, thereby improving picture smoothness. For ease of understanding, the following describes in more detail the method provided in the embodiments of this disclosure with reference to the accompanying drawings.

The method provided in the embodiments of this disclosure may be applied to various different fields, such as a multiplayer online battle arena (MOBA), a real-time strategy game (RTS), or a first-person shooting game (FPS) in the game field, or another field in which frame synchronization needs to be performed. This is not limited in the embodiments of this disclosure.

Figure 2:
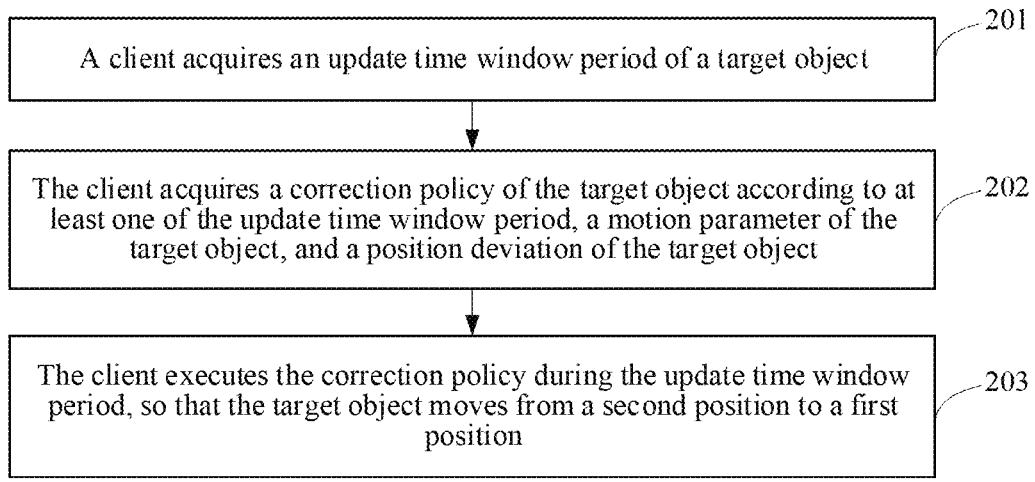
FIG. 2 is a flowchart of an exemplary method for correcting a position of a target object according to an embodiment of this disclosure.

As shown in FIG. 2, a method for correcting a position of a target object according to an embodiment of this disclosure can include the following steps.

In step 201, a client acquires an update time window period (or update time window) of the target object.

In this embodiment, the target object may be an NPC in a game, various props and backgrounds, or may be a game role, or an object requiring frame synchronization in another application scenario. This is not limited in this embodiment of this disclosure. For ease of understanding, in this embodiment, that the target object is an NPC is subsequently used as an example for description. The update time window period is a time interval for interaction between the client and a server. In an actual working process, a position of each target object on the server is synchronized to the client at a time interval. The synchronization interval is not strictly fixed, but is generally stable. Therefore, on the client side, an interval between data received by each target object can be counted according to an existing estimated server time when server information is received.

An update time window period for each object to correct errors is provided according to the time interval at which each object receives server data. The farther the object, the lower the importance, the greater the time interval for sending data, the greater the error, and the greater the update time window period provided to the client for correction.

In step 202, the client acquires a correction policy (or position correction process) of the target object according to at least one of the update time window period, a motion parameter of the target object, and a position deviation of the target object.

In this embodiment, the motion parameter is a parameter used for describing a motion state of the target object, the position deviation is a difference between a first position of the target object in the server and a second position of the target object in the client, and the correction policy is used for moving the target object from the second position to the first position, so as to implement position correction of the target object.

In step 203, the client executes the correction policy during the update time window period, so that the target object moves from the second position to the first position.

In this embodiment, because the correction policy considers at least one of the update time window period, the motion parameter, and the position deviation, the generated correction policy can be adjusted according to the at least one of the foregoing factors, thereby avoiding a feeling of stalling in a position update process.

The method for correcting a position of a target object provided in this embodiment includes: acquiring an update time window period of the target object, the update time window period being a time interval for interaction between a client and a server; acquiring a correction policy of the target object according to at least one of the update time window period, a motion parameter of the target object, and a position deviation of the target object, the motion parameter being a parameter used for describing a motion state of the target object, the position deviation being a difference between a first position of the target object in the server and a second position of the target object in the client, and the correction policy being used for moving the target object from the second position to the first position; and executing the correction policy during the update time window period, so that the target object moves from the second position to the first position. When a correction policy is set, a state of a target object is considered, so that a correction policy that matches the state of the target object is specified, a stalling phenomenon of the target object in a position correction process is prevented, and picture smoothness is improved.

In a game process, to ensure frame synchronization, a client plays a game based on a server time. Therefore, the client needs to determine the server time in real time. Although a time difference between the server and the client is corrected according to a timestamp of a data packet at a time interval in the client, in this method, when a network situation changes, the server time seen by the client is not continuous, or even not incremented, which affects a logical update. The position correction method provided in this embodiment of this disclosure has a relatively high requirement for an estimated server time, which needs to be coherent and incremental, so that an update effect of the client can also be coherent.

For this reason, the method for correcting a position of a target object provided in this embodiment of this disclosure provides an embodiment, and the server time is determined in a smoothing calculation manner. For ease of understanding, the following describes this case in more detail with reference to a service.

Figure 3:
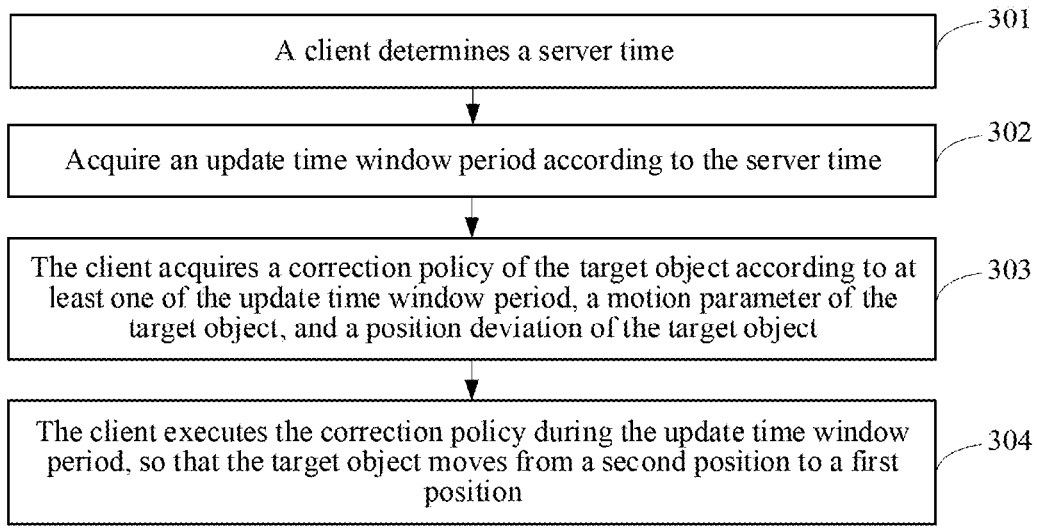
FIG. 3 is a flowchart of another exemplary method for correcting a position of a target object according to an embodiment of this disclosure.

As shown in FIG. 3, a method for correcting a position of a target object according to an embodiment of this disclosure can include the following steps.

In step 301, a client determines a server time.

In this embodiment, only after determining the server time, the client can further perform a subsequent position correction method for the target object, so as to implement frame synchronization with a server.

In a possible implementation, the client may determine the server time in the following manner:

1. The client acquires network transmission delay information sent by the server.

In this embodiment, the network transmission delay information is used for recording a network transmission delay between the client and the server. In a possible implementation, the client may determine the network transmission delay information by using a network layer time sent by the server. In an actual working process, because the network layer of the server adjusts the network layer time according to the transmission delay, the client can acquire the network transmission delay information by using the network layer time.

2. The client determines the server time according to a local time of the client and the network transmission delay information.

In this embodiment, the client may determine the current server time according to the local time and the network transmission delay information. For example, this may be implemented in the following manner:

(1). Set a minimum time unit minIncreasTime and a tolerance value diffRangeLimit of a deviation value between the server time and the network layer time as expected by the client. A specific value may be set by a user according to an actual requirement, and is not limited herein.

(2). The client acquires an interval time realDeltaTime between the current time and a time at which a last server update schedule is received.

(3). The client acquires a network layer time logicServerTime sent by the server, where the network layer time is a time generated by the server according to a current network delay situation, and can reflect a network transmission delay situation.

(4). Determine an ideal server time idealServerTime according to the following algorithm:

$$idealServerTime=FMath::Clamp(SmoothServerTime'+realDeltaTime, logicServerTime-diffRangeLimit, logicServerTime+diffRangeLimit)$$

where idealServerTime is the ideal server time, Clamp( ) is a value algorithm, a value range is between logicServerTime-diffRangeLimit and logicServerTime+diffRangeLimit, and SmoothServerTime' is a last updated smooth server time. When SmoothServerTime+realDeltaTime is less than logicServerTime-diffRangeLimit, idealServerTime=logicServerTime-diffRangeLimit; when SmoothServerTime'+realDeltaTime is greater than logicServerTime+diffRangeLimit, idealServerTime=logicServerTime+diffRangeLimit; and when SmoothServerTime'+realDeltaTime is greater than logicServerTime-diffRangeLimit and less than logicServerTime+diffRangeLimit, idealServerTime=SmoothServerTime+realDeltaTime.

(5). Set an initial smooth rate smoothRate.

In this embodiment, an initial assignment value of the smooth rate may be adjusted according to an actual requirement, and is not limited in this embodiment of this disclosure.

(6). When the smooth server time SmoothServerTime is greater than the network layer time logicServerTime, it indicates that the current smooth server time is too fast, and the SmoothServerTime needs to be adjusted by performing subsequent steps.

(7). According to the initial smooth rate smoothRate, the smooth server time SmoothServerTime', and the network layer time logicServerTime, a latest real-time smooth rate is determined by using the following algorithm:

$$smoothRate=FMath::Max(smoothRate'*0.25f, smoothRate'-(SmoothServerTime'-logicServerTime)*0.75f);$$

In this embodiment, the smooth server time SmoothServerTime is obtained according to the smooth rate smoothRate. When the SmoothServerTime is too fast, the smoothRate needs to be adjusted, so that the SmoothServerTime returns to a reasonable time. The adjustment of smoothRate uses a maximization algorithm Max( ) to take a maximum value between smoothRate'*0.25f and smoothRate'-(SmoothServerTime'-logicServerTime)*0.75f as an updated smoothRate. The smoothRate' is a smooth rate calculated when the client and the server are updated last time. Because the current SmoothServerTime is too fast, it indicates that the smoothRate' is relatively radical. Therefore, smoothRate' is enabled to become smaller by multiplying 0.25. SmoothServerTime'-logicServerTime is a time difference between a current balanced server time and the network layer time. The time difference is multiplied by 0.75 for adjustment, and then an adjusted time difference is subtracted by the current smooth rate smoothRate', so that the current smooth rate can also be reduced. The foregoing parameters 0.25 and 0.75 are merely an example. Specific values are not limited, provided that the sum of the two values is equal to 1.

(8). Acquire a latest smooth server time SmoothServerTime according to the real-time smooth rate. For example, the following algorithm may be used for implementation.

$$SmoothServerTime=FMath::Max(SmoothServerTime'+miniIncraeseTime, idealServerTime*SmoothRate+logicServerTime*(1.0f-SmoothRate))$$

An updated smooth server time is acquired by using a maximization algorithm Max( ) to take a maximum value between SmoothServerTime'+miniIncraeseTime and idealServerTime*SmoothRate+logicServerTime*(1.0f-SmoothRate), where SmoothServerTime'+miniIncraeseTime is a last calculated smooth server time plus a minimum time unit, that is, the current smooth server time is obtained according to an original smooth server time, and idealServerTime*SmoothRate+logicServerTime*(1.0f-SmoothRate) is the ideal server time idealServerTime (calculated in the previous step) multiplied by the latest smooth rate SmoothRate plus the product of the network layer time multiplied by 1 minus the smooth rate, and a maximum value between the two is a current smooth server time.

In step 302, the update time window period is acquired according to the server time.

In this embodiment, according to the server time acquired in step 301, synchronization between the current time of the client and the server time is maintained, and a case that the time of the client is not continuous or even not incremental does not occur. Based on the smooth server time, the client may acquire the update time window period in the manner described in step 201. For a related implementation, refer to the description in step 201. Details are not described herein again.

For subsequent steps 303 and 304, refer to steps 202 to 203. Details are not described herein again.

In this embodiment, the client estimates the server time by using the local time and the network time delay information, so that the smooth server time is locally obtained on the client, and synchronization with the server time is maintained, thereby effectively preventing a case in which the time of the client is not continuous or even not incremental due to a network condition change, thereby ensuring that a subsequent method for correcting a position of a target object is smoothly performed.

When the foregoing correction policy is executed, to avoid a position update stalling phenomenon shown in FIG. 1, the target object needs to be uniformly moved within the update time window period, so that in the position correction process, the target object that deviates from the position in the server pursues the position in the server uniformly. To this end, the method provided in this disclosure provides a specific implementation for implementing the correction policy. For ease of understanding, the following describes this case in more detail with reference to the accompanying drawings.

Figure 4:
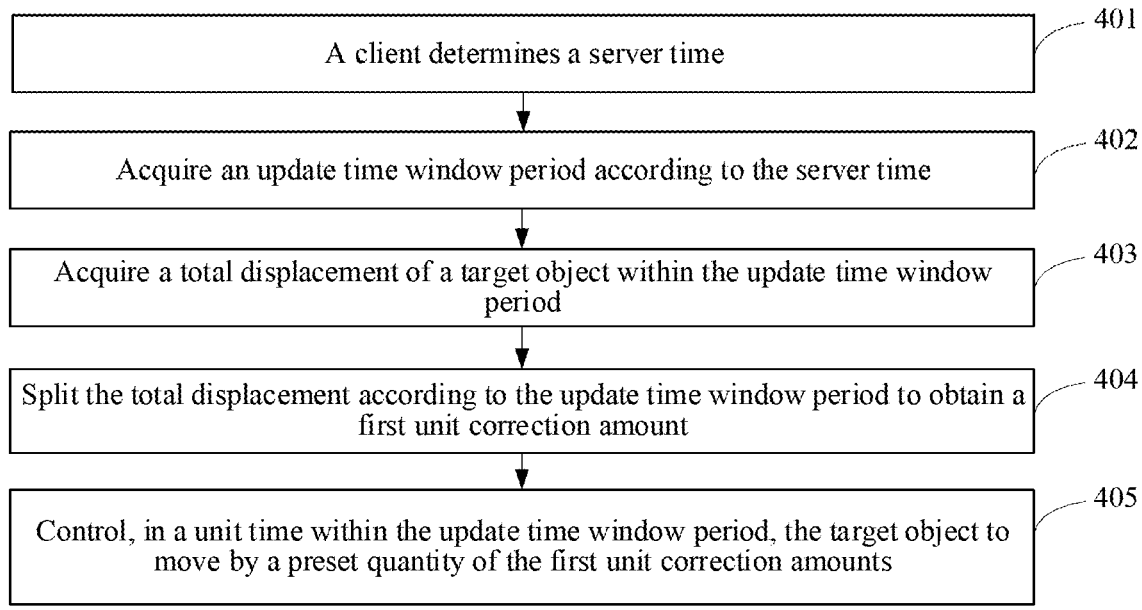
FIG. 4 is a flowchart of another exemplary method for correcting a position of a target object according to an embodiment of this disclosure.

As shown in FIG. 4, a method for correcting a position of a target object according to an embodiment of this disclosure can include the following steps.

For steps 401 and 402, refer to descriptions of steps 301 and 302. Details are not described herein again.

In step 403, a total displacement of the target object within the update time window period is acquired.

In this embodiment, the target object for which position correction is to be performed needs to be moved from an existing position to a logical position in a server within the update time window period, so as to implement position correction of the target object. A displacement during the position correction is the total displacement. The total displacement may be directly acquired by using the foregoing position deviation, that is, the difference (position deviation) between the first position of the target object in the server and the second position of the target object in the client, that is, the foregoing total displacement.

In step 404, the total displacement is split according to the update time window period to obtain a first unit correction amount.

In this embodiment, the first unit correction amount is a displacement of the target object within a unit time when the correction policy is executed. For example, the position deviation is 1 meter, that is, the difference between the current position of the target object in the client (the second position) and an actual position (the first position) of the target object in the server is 1 meter. The update time window period is 0.5 second. Then, the 1 meter is split into five parts, and each part is 0.2 meter, that is, the first unit correction amount is 0.2 meter.

In step 405, the target object is controlled, in a unit time within the update time window period, to move by a preset quantity of the first unit correction amounts.

In this embodiment, the sum of all unit times in the update time window period constitutes the entire update time window period, and each time the target object is controlled to move by the preset quantity of the first unit correction amounts in a unit time, movement by the total displacement can be completed evenly in the update time window period, thereby implementing coherent and smooth position correction. For example, if the position deviation is 1 meter, the update time window period is 0.5 second, and the unit time is 0.1 second, in a process of executing the correction policy, the position deviation is averagely reduced by 0.2 meter every 0.1 second. At the end of the update time window period, the target object moves from the second position to the first position, so that the target object can uniformly correct the position deviation, and no stalling phenomenon occurs or can be reduced.

In this embodiment, the total displacement is acquired, and the total displacement is split according to the update time window period, so that the first unit correction amount is acquired, and the first unit correction amount is executed in a unit time in the update time window period, so that the target object can perform coherent and smooth position correction, and no stalling phenomenon is generated or can be reduced.

However, in a relatively ideal case is further described. That is, according to the motion state of the target object, movement by the entire total displacement can be completed exactly in the update time window period. In an actual working process, a magnitude of the position deviation is different, the motion state of the target object is different, and it cannot be ensured that the target object can reach exactly the first position from the second position in the update time window period. Therefore, to maintain coherence of the picture, when the total displacement needs to be acquired, a motion state parameter of the target object needs to be considered at a start moment of the update time window period, so that a different total displacement is acquired according to the motion state parameter, and a final correction policy meets the motion state of the target object.

In a possible implementation, the motion parameter of the target object may have the following two cases: 1. The motion parameter of the target object includes a speed and an acceleration. 2. The motion parameter of the target object includes a preset special operation. For ease of understanding, the following describes the two cases in detail with reference to the accompanying drawings.

I. The motion parameter of the target object includes a speed and an acceleration.

In this embodiment, when the update time window period starts, the target object has a specific motion speed and acceleration. Based on the speed and acceleration, a distance traveled by the target object in the update time window period may exceed the displacement of the position deviation, or the target object still cannot reach the displacement of the position deviation in the update time window period by using a maximum speed and acceleration that can be reached. In these different cases, different adjustment needs to be performed on the correction policy, including the following steps.

Figure 5:
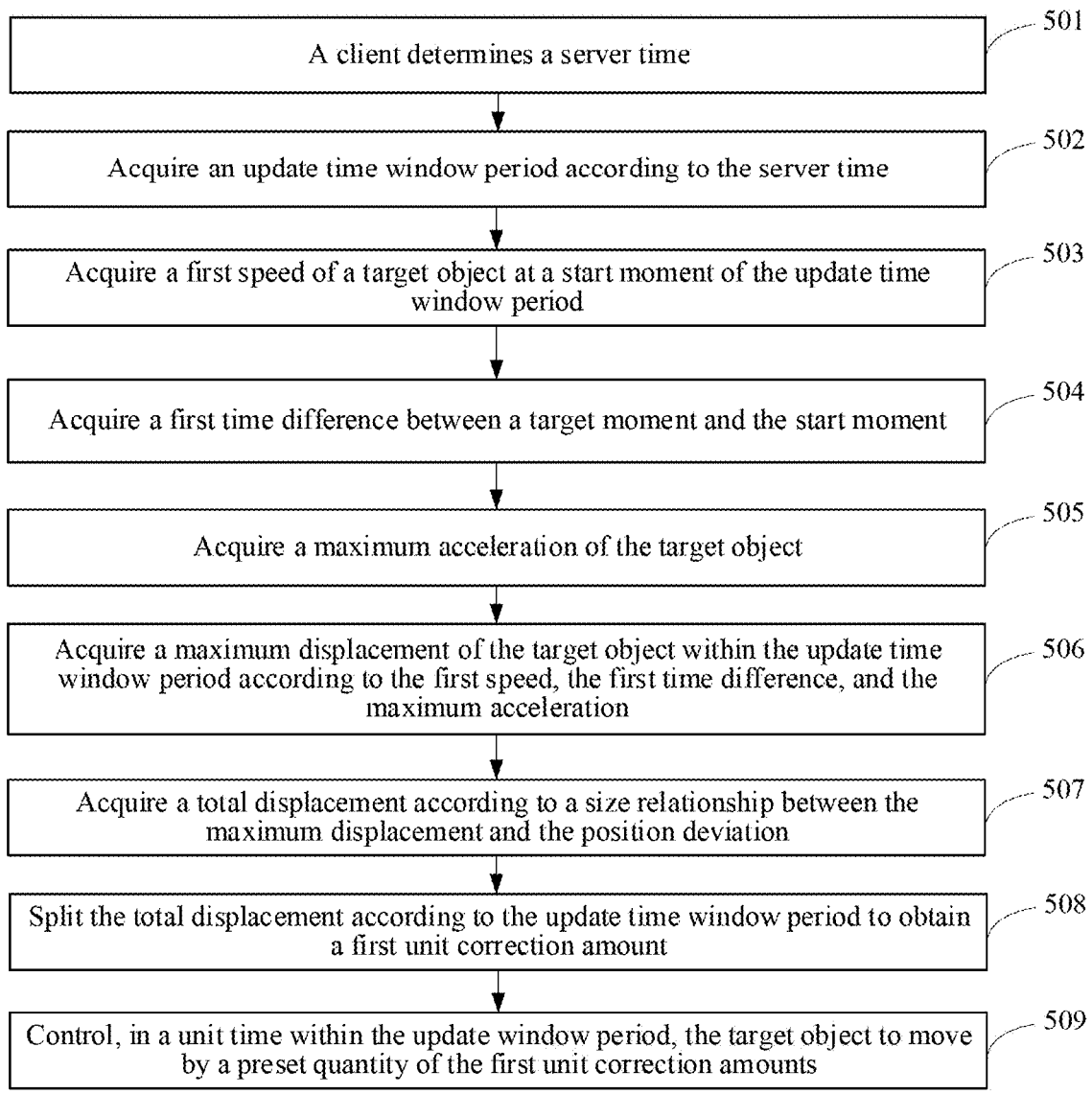
FIG. 5 is a flowchart of another exemplary method for correcting a position of a target object according to an embodiment of this disclosure.

As shown in FIG. 5, a method for correcting a position of a target object according to an embodiment of this disclosure can include the following steps.

For steps 501 and 502, refer to descriptions of steps 301 and 302. Details are not described herein again.

In step 503, a first speed of the target object is acquired at a start moment (or start time) of the update time window period.

In this embodiment, the acquired first speed is an initial speed $V_0$ of the target object in the update time window period.

In step 504, a first time difference between a target moment (or target time) and the start moment is acquired.

In this embodiment, the target moment is a moment greater than the start moment in the update time window period. For example, if the start moment of the update time window period is $t_0$, and the target moment is $t_1$, the first time difference $t=t_1-t_0$.

In step 505, a maximum acceleration of the target object is acquired.

In this embodiment, the maximum acceleration is a preset value. In each game, the maximum acceleration of the target object in the game is preset. For example, an acceleration of a car in a game needs to be greater than an acceleration of a game role, and an acceleration of each NPC has a preset upper limit. The upper limit is a maximum acceleration a of the target object. The preset value may be set according to an actual requirement, which is not limited in this embodiment of this disclosure.

In step 506, a maximum displacement of the target object within the update time window period is acquired according to the first speed, the first time difference, and the maximum acceleration.

In this embodiment, a specific calculation manner of the maximum displacement $S_1$ is as follows:

$$S_1 = v_0 t + \frac{1}{2} a t^2$$

$V_0$ is the first speed, t is the first time difference, and a is the maximum acceleration.

Therefore, according to the foregoing algorithm, a maximum displacement that can be reached by the target object at any time point in the update time window period may be obtained. When the target moment is an end moment of the update time window period, the calculated maximum displacement is the maximum displacement that can be achieved by the target object in the update time window period.

In step 507, the total displacement is acquired according to a size relationship between the maximum displacement and the position deviation.

In this embodiment, determining the total displacement according to the difference between the maximum displacement and the position deviation specifically includes the following several cases.

(1). The maximum displacement is equal to the position deviation.

In this embodiment, the maximum displacement is equal to the position deviation, that is, in the update time window period, the target object can precisely implement position correction. In this case, the method of FIG. 4 can be directly performed, and details are not described herein again.

(2). The maximum displacement is less than the position deviation.

In this embodiment, when the maximum displacement is less than the position deviation, it indicates that even if the target object moves at the maximum acceleration, the target object cannot move to a predetermined position in the update time window period. In this case, the maximum displacement needs to be set as the total displacement, and in this case, there is another difference $S_2$ between the total displacement and the position deviation, and $S_2$ is counted into a position deviation for position correction in a next update time window period. This is solved in a next round of position correction. Because the target object in the current round uses the maximum acceleration, the target object has a relatively large initial speed at the start of the next round of update. Therefore, the position deviation that is not completed in the current round of update may be completed in the next round of correction.

(3). The maximum displacement is greater than the position deviation.

In this embodiment, when the maximum displacement is greater than the position deviation, the position deviation needs to be set to the total displacement. Otherwise, if the maximum displacement is used as the total displacement, the target object moves beyond the predetermined position in the update time window period. In this case, when the target object overcomes the position deviation and moves to the predetermined position, the position correction is completed. In this case, the speed of the target object needs to be updated according to a current acceleration, so as to prevent an abrupt change of the speed of the target object in a next round of update which may cause a stalling phenomenon, and an algorithm of updating the target object is as follows:

$$v_t = v_0 + at$$

where $v_t$ is an updated speed of the target object, $v_0$ is the speed before update, a is the maximum acceleration, and t is duration of the update time window period.

For subsequent steps 508 and 509, refer to steps 404 and 405. Details are not described herein again.

In this embodiment, the maximum displacement that can be reached by the target object in the update time window period is determined by using the speed and the acceleration of the target object, and further, the total displacement of the target object in the update time window period is determined according to the size relationship between the maximum displacement and the position deviation. Finally, the position correction policy of the target object is configured according to the total displacement, so that the position correction policy of the target object can be properly configured according to an actual motion state of the target object, and the position correction of the target object is coherent and smooth.

2. The motion parameter of the target object includes the preset special operation.

In this embodiment, the target object, for example, an NPC in a game, may further include a special operation in addition to correction to the predetermined position in a related motion manner. For example, the special operation is "flash", that is, a game rule allows the NPC to directly reach the second point from the first point without passing through any route. In this case, according to this special operation, a flash operation may be correspondingly performed on the NPC in the position correction process, so that the position correction policy matches the actual motion state of the NPC. For ease of understanding, detailed descriptions are provided below with reference to the accompanying drawings.

Figure 6:
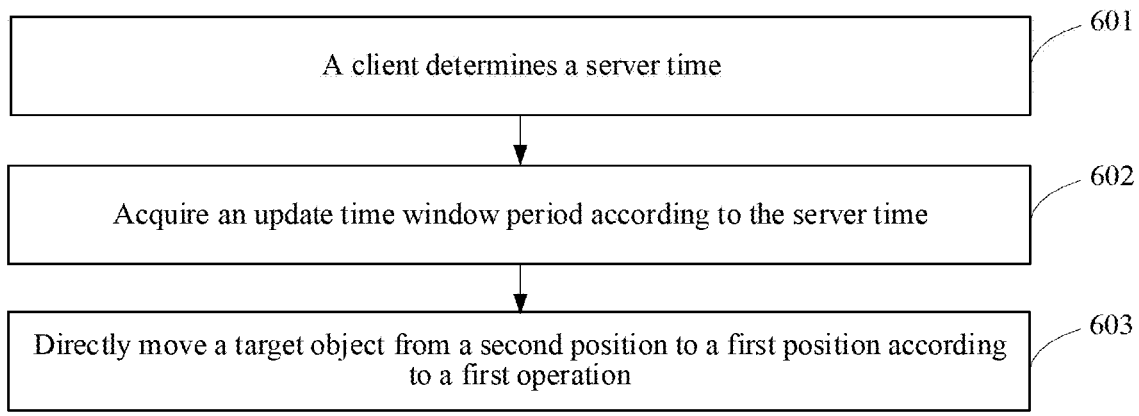
FIG. 6 is a flowchart of another exemplary method for correcting a position of a target object according to an embodiment of this disclosure.

As shown in FIG. 6, a method for correcting a position of a target object according to an embodiment of this disclosure can include the following steps.

For steps 601 and 602, refer to descriptions of steps 301 and 302. Details are not described herein again.

In step 603, the target object directly moves from the second position to the first position according to the first operation.

In this embodiment, the first operation is the foregoing special operation, for example, a "flash" operation, the second position is the position of the target object in the client, and the first position is the position of the target object in the server. According to the first operation, the target object "flashes" from the second position to the first position, so that the position correction policy matches the actual motion state of the target object in the game.

In a possible implementation, the first operation may be another special operation. For example, if the target object has a special acceleration that exceeds an acceleration threshold, the embodiment of FIG. 5 may be executed according to the special acceleration in this case. This is not limited in this embodiment of this disclosure.

In this embodiment, with reference to the game rule set in the game, the special operation of the target object at the start moment of the update time window period is acquired, and the position correction policy is executed on the target object according to a special operation condition, so that the position correction policy matches the actual motion state of the target object in the game, thereby ensuring coherence of position correction of the target object in the special operation condition.

In the process of performing position correction on the target object, not only the position of the target object needs to be corrected, but also a direction of the target object needs to be corrected. For example, in the current client, the NPC faces the east in a game map, and in an actual server, a direction of the NPC faces the west. In this case, when performing position correction, the NPC needs to rotate smoothly within the update time window period, so as to ensure display coherence of the NPC in the game. Otherwise, if the NPC rotates instantly from the east to the west, incoherence of the game picture is caused. In view of this, an embodiment of this disclosure provides a solution. For ease of understanding, the following describes the solution in more detail with reference to the accompanying drawings.

Figure 7:
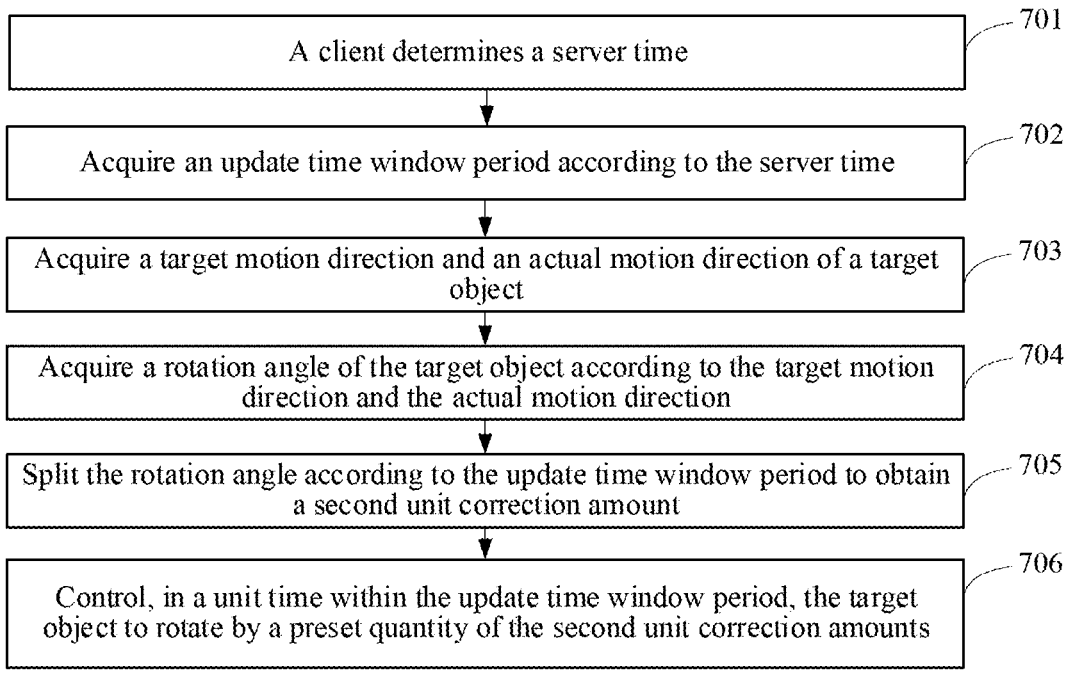
FIG. 7 is a flowchart of another exemplary method for correcting a position of a target object according to an embodiment of this disclosure.

As shown in FIG. 7, a method for correcting a position of a target object according to an embodiment of this disclosure can include the following steps.

For steps 701 and 702, refer to descriptions of steps 301 and 302. Details are not described herein again.

In step 703, a target motion direction and an actual motion direction of the target object is acquired.

In this embodiment, the target motion direction is a direction of the target object in the server, and the actual motion direction is a current direction of the target object in the client.

In step 704, a rotation angle of the target object is acquired according to the target motion direction and the actual motion direction.

In this embodiment, a difference between the target motion direction and the actual motion direction is a rotation angle by which the target object needs to rotate in a position correction process.

In step 705, the rotation angle is split according to the update time window period to obtain a second unit correction amount.

In this embodiment, the second unit correction amount is a rotation amount of the target object in a unit time when a correction policy is executed, for example, if the rotation angle is 5° and the update time window period is 0.5 second, the second unit correction amount is 1°.

In step 706, the target object is controlled, in a unit time within the update time window period, to rotate by a preset quantity of the second unit correction amounts.

The sum of all unit times in the update time window period constitutes the entire update time window period, and each time the target object is controlled to rotate by the preset quantity of the second unit correction amounts in a unit time, rotation by the total displacement can be completed evenly in the update time window period, thereby implementing coherent and smooth angle correction. For example, if the rotation angle is 5° and the update time window period is 0.5 second, the second unit correction amount is 1°. In the update time window period, the target object rotates by 1° from the actual motion direction to the target motion direction every 0.1 second, thereby implementing smooth rotation of the target object, preventing the target object from rotating instantaneously in an angle correction process and causing display incoherence of a game picture.

The angle correction solution of FIG. 7 may be performed in synchronization with the foregoing position correction solution, so as to simultaneously correct the position and the angle of the target object.

Based on the foregoing description, the following uses an example in which a target object is a use scenario of a game NPC in a game scenario to describe in detail a method for correcting a position of a target object provided in this embodiment of this disclosure.

Figure 8:
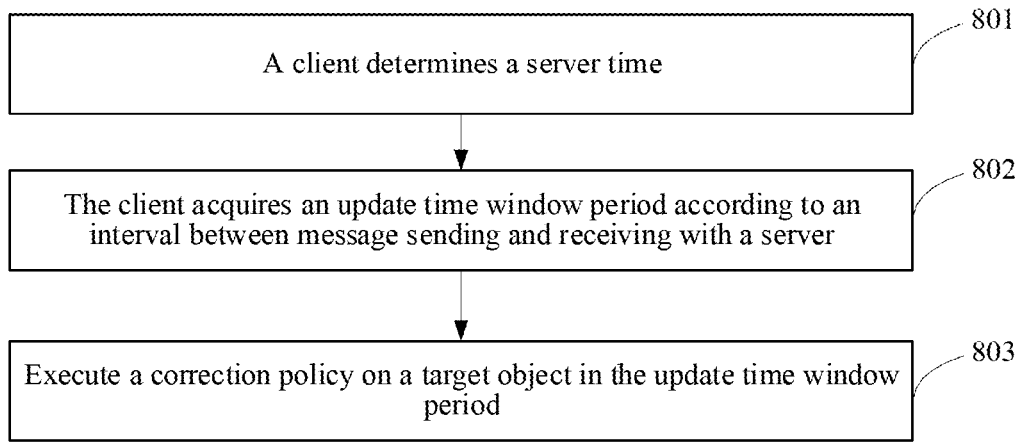
FIG. 8 is a flowchart of another exemplary method for correcting a position of a target object according to an embodiment of this disclosure.

As shown in FIG. 8, a method for correcting a position of a target object according to an embodiment of this disclosure can include the following steps.

In step 801, a client determines a server time.

In this embodiment, for a specific implementation of determining the server time by the client, refer to FIG. 3 for example. Details are not described herein again.

In step 802, the client acquires an update time window period according to an interval between message sending and receiving with the server.

In this embodiment, for a specific acquiring manner of the update time window period, refer to the description FIG. 2 and FIG. 3 for example. Details are not described herein again.

In step 803, a correction policy is executed on the target object in the update time window period.

In this embodiment, the correction policy is executed on the target object in the update time window period, so as to implement smooth linear correction on the target object, so that display of the correction picture is coherent. For example, the correction policy may include smoothing of a speed and an acceleration of the target object, and smoothing of steering. For balance steps of the speed and the acceleration, refer to FIG. 4 to FIG. 5. For smoothing of steering, refer to FIG. 7, and details are not described herein again.

Figure 9:
FIG. 9 is a schematic diagram of a working scenario of a method for correcting a position of a target object according to an embodiment of this disclosure.

As shown in FIG. 9, a method for correcting a position of a target object provided in an embodiment of this disclosure can be used for correcting positions of a plurality of NPCs in a game. In FIG. 9, there are a plurality of NPCs 901. Each NPC in FIG. 9 has one ID, so as to distinguish the NPC from other NPCs. Each NPC separately performs the method for correcting a position of a target object provided in the embodiment of this disclosure, so as to implement smooth and coherent position correction, thereby ensuring smoothness of an entire game picture.

Figure 10:
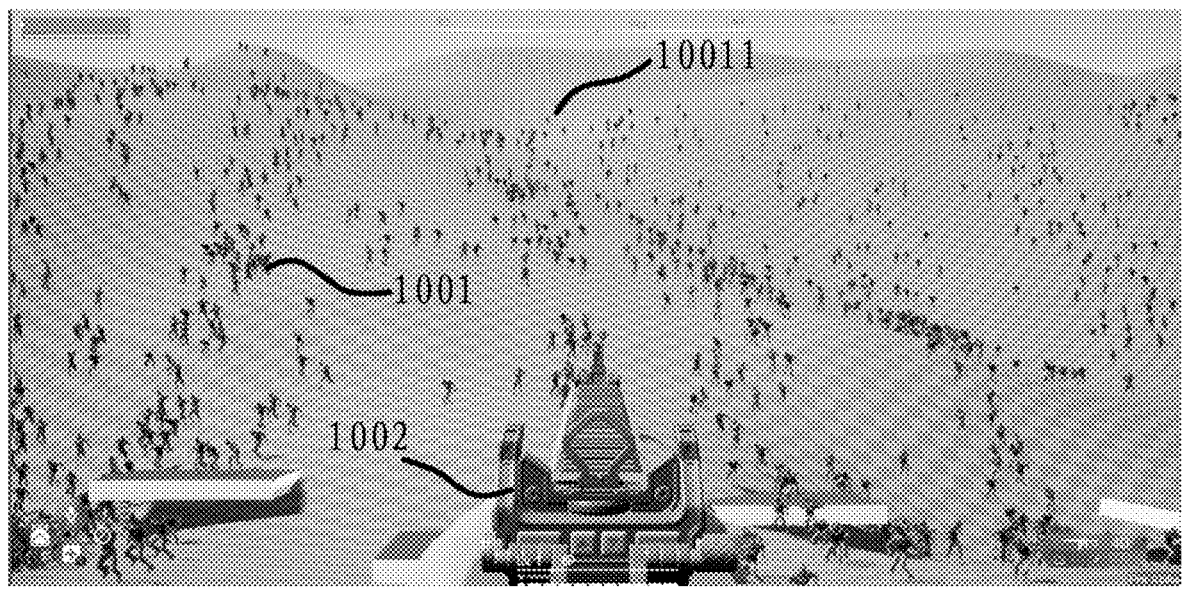
FIG. 10 is a schematic diagram of a working scenario of a method for correcting a position of a target object according to an embodiment of this disclosure.

As shown in FIG. 10, in a large game, a large quantity of NPCs 1001 are supported to run at the same time. Therefore, network replication pressure is relatively high, and a case in which data is not sent in time can easily occur. In particular, for an NPC 10011 relatively far away from a player role 1002, update frequency is relatively low, and a remote monster is frequently triggered because data is sent with a low priority, and path searching logic is frequently triggered. As a result, a prediction error on the client can often be caused. Because data sent by a next server is often data on a new path, a relatively frequent stalling phenomenon can be found, and a stalling phenomenon of the remote NPC can be more serious. According to the position correction method provided in this embodiment of this disclosure, in the control logic provided in any one of the foregoing embodiments, the remote NPC 10011 can move smoothly as a near NPC 1001 without a stalling phenomenon, and a speed is always very smooth. This can ensure smoothness of the game picture.

The method for correcting a position of a target object provided in this embodiment includes: acquiring an update time window period of the target object, the update time window period being a time interval for interaction between a client and a server; acquiring a correction policy of the target object according to at least one of the update time window period, a motion parameter of the target object, and a position deviation of the target object, the motion parameter being a parameter used for describing a motion state of the target object, the position deviation being a difference between a first position of the target object in the server and a second position of the target object in the client, and the correction policy being used for moving the target object from the second position to the first position; and executing the correction policy during the update time window period, so that the target object moves from the second position to the first position. When a correction policy is set, a state of a target object is considered, so that a correction policy that matches the state of the target object is specified, a stalling phenomenon of the target object in a position correction process is prevented, and picture smoothness is improved.

The foregoing describes the solutions provided in the embodiments of this disclosure. It may be understood that to implement the foregoing functions, the computer device includes corresponding hardware structures and/or software modules for performing the functions. A person skilled in the art should be easily aware that, in combination with the modules and algorithm steps of the examples described in the embodiments disclosed in this specification, this disclosure can be implemented by hardware or a combination of hardware and computer software. Whether a function is implemented by hardware or computer software driving hardware depends on particular applications and design constraints of the technical solutions. Those skilled in the art may use different methods to implement the described functions for each particular application, but such implementation is not to be considered beyond the scope of this disclosure.

In walls of a hardware structure, the foregoing method may be implemented by one entity device, or may be implemented jointly by a plurality of entity devices, or may be a logical function module in one entity device. This is not specifically limited in this embodiment of this disclosure.

Figure 11:
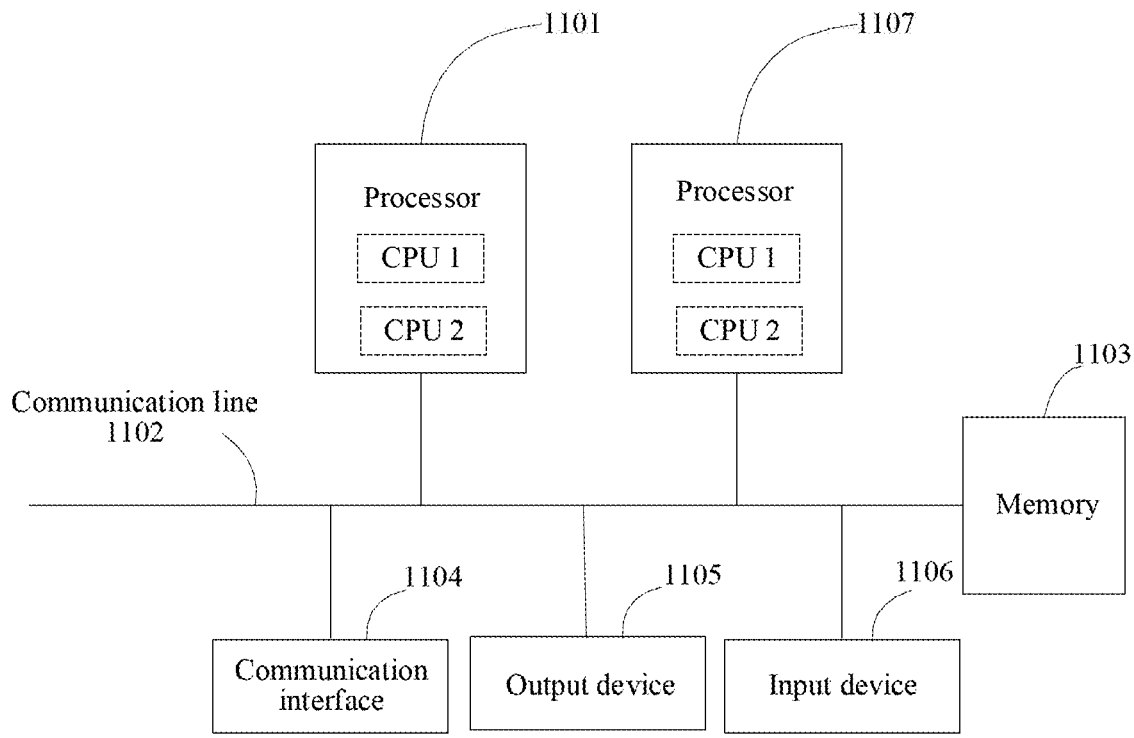
FIG. 11 is a schematic diagram of a computer device according to an embodiment of this disclosure.

For example, the foregoing method may be implemented by using the computer device in FIG. 11. FIG. 11 is a schematic structural diagram of hardware of a computer device according to an embodiment of this disclosure. The computer device includes: at least one processor 1101, a communication line 1102, a memory 1103, and at least one network interface 1104.

The processor 1101 may be processing circuitry such as a general-purpose central processing unit (CPU), a microprocessor, an application-specific integrated circuit (ASIC), or one or more integrated circuits configured to control execution of a program in the solutions of this disclosure.

The communication line 1102 may include a channel, to transmit information between the foregoing components.

The communication interface 1104 may include an apparatus using any transceiver or the like, to communicate with another device or a communication network such as an Ethernet, a radio access network (RAN), or a wireless local area network (WLAN).

The memory 1103 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or another compact disc storage, optical disc storage (including compressed optical discs, laser discs, optical discs, digital versatile optical discs, and Blu-ray discs), magnetic disk storage media, or another magnetic storage device, or may be any another medium that can be used to carry or store desired program code in the form of an instruction or a data structure and that can be accessed by a computer. The memory may exist independently, and connect to the processor by using the communication line 1102. The memory may alternatively be integrated with the processor.

The memory 1103 is configured to store a computer-executable instruction for performing the solutions of this disclosure, and is controlled and executed by the processor 1101. The processor 1101 is configured to execute the computer executable instructions stored in the memory 1103, so as to implement the method provided in the foregoing embodiments of this disclosure.

The computer-executable instruction in the embodiments of this disclosure may also be referred to as an application code. This is not specifically limited in the embodiments of this disclosure.

In an embodiment, the processor 1101 may include one or more CPUs, for example, a CPU 1 and a CPU 2 in FIG. 11.

In an embodiment, the computer device may include one or more processors, for example, a processor 1101 and a processor 1107 in FIG. 11. Each of these processors may be a single-core (single-CPU) processor, or may be a multi-core (multi-CPU) processor. The processor herein may be one or more devices or circuits, and/or a processing core configured to process data (for example, executable instructions).

In an embodiment, the computer device may further include an input device 1105 and an output device 1106. The output device 1105 communicates with the processor 1101 and can display information in a plurality of ways. For example, the output device 1105 may be a liquid crystal display (LCD), a light emitting diode (LED) display device, a cathode ray tube (CRT) display device, or a projector, or the like. The input device 1106 communicates with the processor 1101, and can receive user input in a plurality of ways. For example, the input device 1106 may be a keyboard, a mouse, a touchscreen device, or a sensor device.

The above computer device may be a general-purpose device or a special-purpose device. The computer device may be a desktop computer, a portable computer, a network server, a personal digital assistant (PDA), a mobile phone, a tablet computer, a wireless terminal device, an embedded device, or a device with a similar structure in FIG. 11. The embodiments of this disclosure do not limit the type of the computer device.

In this embodiment of this disclosure, functional units of the storage device and the core network device may be divided based on the foregoing method examples. For example, the functional units may be divided in such a way that each functional unit corresponds to a specific function, or two or more functions may be integrated into one processing unit. The integrated unit may be implemented in a form of hardware, or may be implemented in a form of a software functional unit. It should be noted that, in this embodiment of this disclosure, the division of the modules is merely an example, and is merely division of logical functions. During actual implementation, there may be another division manner.

Figure 12:
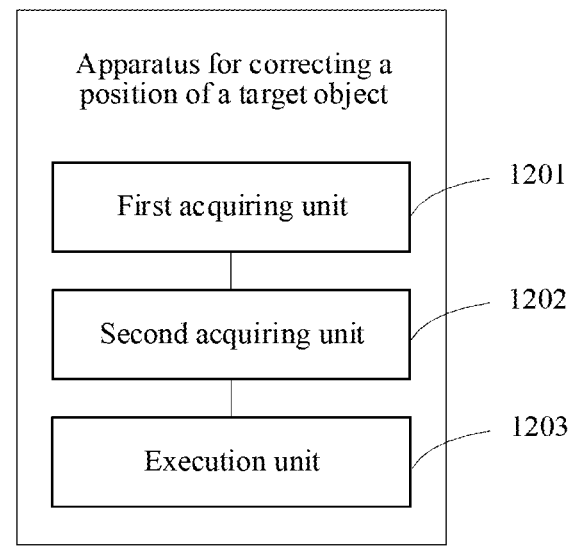
FIG. 12 is a schematic diagram of an apparatus for correcting a position of a target object according to an embodiment of this disclosure.

For example, in a case in which functional units are divided in an integrated manner, FIG. 12 is a schematic diagram of an apparatus for correcting a position of a target object.

As shown in FIG. 12, the apparatus for correcting a position of a target object provided in this embodiment of this disclosure can include a first acquiring unit 1201, a second acquiring unit 1202, and an execution unit 1203. One or more units of the apparatus can be implemented by processing circuitry, software, or a combination thereof, for example.

The first acquiring unit 1201 is configured to acquire an update time window period of the target object, the update time window period being a time interval for interaction between the client and a server.

The second acquiring unit 1202 is configured to acquire a correction policy of the target object according to at least one of the update time window period acquired by the first acquiring unit 1201, a motion parameter of the target object, and a position deviation of the target object, the motion parameter being a parameter used for describing a motion state of the target object, the position deviation being a difference between a first position of the target object in the server and a second position of the target object in the client, and the correction policy being used for moving the target object from the second position to the first position.

The execution unit 1203 is configured to execute, during the update time window period acquired by the first acquiring unit 1201, the correction policy acquired by the second acquiring unit 1202, so that the target object moves from the second position to the first position.

In a possible implementation, the first acquiring unit 1201 is specifically configured to:
- determine a server time; and
- acquire the update time window period according to the server time.

In a possible implementation, the first acquiring unit 1201 is further configured to:
- acquire network transmission delay information sent by the server, the network transmission delay information being used for recording a network transmission delay between the client and the server; and
- determine the server time according to a local time of the client and the network transmission delay information.

In a possible implementation, the second acquiring unit 1202 is further configured to:
- acquire a total displacement of the target object within the update time window period; and
- split the total displacement according to the update time window period to obtain a first unit correction amount, the first unit correction amount being a displacement of the target object within a unit time in a case of executing the correction policy; and the execution unit 1203 is configured to:
- control, in a unit time within the update time window period, the target object to move by a preset quantity of the first unit correction amounts.

In a possible implementation, the motion parameter of the target object includes a speed and an acceleration of the target object, and the second acquiring unit 1202 is further configured to:
- acquire a first speed of the target object at a start moment of the update time window period;
- acquire a first time difference between a target moment and the start moment, the target moment being a moment greater than the start moment within the update time window period;
- acquire a maximum acceleration of the target object, the maximum acceleration being a preset value;
- acquire a maximum displacement of the target object within the update time window period according to the first speed, the first time difference, and the maximum acceleration; and
- acquire the total displacement according to a size relationship between the maximum displacement and the position deviation.

In a possible implementation, the second acquiring unit 1202 is further configured to:
- count, by using the maximum displacement as the total displacement, a difference between the position deviation and the maximum displacement into a position deviation for position correction in a next update time window period in a case that the maximum displacement is less than the position deviation;
- use a distance of the position deviation as the total displacement of the target object within the update time window period in a case that the maximum displacement is equal to the position deviation; or
- use a distance of the position deviation as the total displacement of the target object within the update time window period in a case that the maximum displacement is greater than the position deviation;
- acquire a second speed of the target object at an end moment of the update time window period according to the first speed, the first time difference, and the maximum acceleration; and
- use the second speed as a speed of the target object at a start moment of the next update time window period.

In a possible implementation, the motion parameter of the target object includes a preset first operation, and the second acquiring unit 1202 is further configured to:
- directly move the target object from the second position to the first position according to the first operation.

In a possible implementation, the motion parameter of the target object includes a motion direction of the target object, and the second acquiring unit 1202 is further configured to:
- acquire a target motion direction and an actual motion direction of the target object;
- acquire a rotation angle of the target object according to the target motion direction and the actual motion direction; and
- split the rotation angle according to the update time window period to obtain a second unit correction amount, the second unit correction amount being a rotation amount of the target object within a unit time in a case of executing the correction policy; and the execution unit 1203 is configured to:
- control, in a unit time within the update time window period, the target object to rotate by a preset quantity of the second unit correction amounts.

An embodiment of this disclosure further provides a computer storage medium such as a non-transitory computer-readable storage medium, including an instruction, when run on a computer device, causing the computer device to perform the foregoing method.

For detailed description of the program stored in the computer storage medium provided in this embodiment of this disclosure, reference may be made to the foregoing embodiment, and details are not described herein again.

An embodiment of this disclosure further provides a computer program product, when executed, performing the foregoing method. The embodiments in this specification are all described in a progressive manner. Description of each of the embodiments focuses on differences from other embodiments, and reference may be made to each other for the same or similar parts among the embodiments. The apparatus embodiments basically correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to more clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art can use different methods to implement the described functions for each particular application, but it should not be considered that the implementation goes beyond the scope of the embodiments of this disclosure.

In combination with the embodiments disclosed herein, steps of the method or algorithm described may be directly implemented by using hardware, a software module executed by a processor, or the combination thereof. The software module may be placed in a RAM, a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables a person skilled in the art to implement or use this disclosure. Various modifications to the embodiments are obvious to the person skilled in the art, and general principles defined in this specification may be implemented in other embodiments without departing from the spirit or scope of this disclosure. Therefore, this disclosure is not limited to the embodiments shown in the specification, but conforms to the widest scope consistent with the principle and features that are disclosed in the specification.

What is claimed is:

1. A method for correcting a position of a target object, the method comprising:
   determining, by processing circuitry of a client, which position correction process to perform on the target object according to an update time window of a server, a motion state of the target object, and a position deviation of the target object, the position deviation being a difference between a first position of the target object in the server and a second position of the target object in the client, and the position correction process moving the target object from the second position to the first position being selected based on a comparison between the position deviation and a maximum displacement, the maximum displacement being determined based on the update time window of the server and the motion state of the target object; and
   executing the position correction process during the update time window to move the target object from the second position to the first position.

2. The method according to claim 1, further comprising:
   determining a server time; and
   acquiring the update time window according to the server time.

3. The method according to claim 2, wherein the determining the server time comprises:
   receiving network transmission delay information from the server, the network transmission delay information indicating a network transmission delay between the client and the server; and
   determining the server time according to a local time of the client and the network transmission delay information.

4. The method according to claim 1, wherein the determining the position correction process comprises:
   acquiring a total displacement of the target object within the update time window; and
   splitting the total displacement according to the update time window to obtain a first unit correction amount, the first unit correction amount being a displacement of the target object within a unit time when executing the position correction process; and
   the executing the position correction process includes:
   controlling, in the unit time within the update time window, the target object to move by a preset quantity of the first unit correction amount.

5. The method according to claim 1, wherein the motion state of the target object includes a speed and an acceleration of the target object, and the method further comprises:
   acquiring a first speed of the target object at a start time of the update time window;
   acquiring a first time difference between a target time and the start time, the target time being after the start time within the update time window;
   acquiring a maximum acceleration of the target object, the maximum acceleration being a preset value;
   acquiring the maximum displacement of the target object within the update time window according to the first speed, the first time difference, and the maximum acceleration; and
   acquiring a total displacement according to a size relationship between the maximum displacement and the position deviation.

6. The method according to claim 5, wherein the acquiring the total displacement according to the size relationship comprises:
   counting, by using the maximum displacement as the total displacement, a difference between the position deviation and the maximum displacement into a position deviation for position correction in a next update time window when the maximum displacement is less than the position deviation;
   using a distance of the position deviation as the total displacement of the target object within the update time window when the maximum displacement is equal to the position deviation; or
   using a distance of the position deviation as the total displacement of the target object within the update time window when the maximum displacement is greater than the position deviation;
   acquiring a second speed of the target object at an end time of the update time window according to the first speed, the first time difference, and the maximum acceleration; and
   using the second speed as a speed of the target object at a start time of the next update time window.

7. The method according to claim 1, wherein the motion state of the target object includes a preset first operation, and the determining the position correction process comprises:
   directly changing the target object from the second position to the first position according to the first operation.

8. The method according to claim 1, wherein the motion state of the target object includes a motion direction of the target object, and the determining the position correction process of the target object comprises:
   acquiring a target motion direction and an actual motion direction of the target object;
   acquiring a rotation angle of the target object according to the target motion direction and the actual motion direction; and
   splitting the rotation angle according to the update time window to obtain a second unit correction amount, the second unit correction amount being a rotation amount of the target object within a unit time when executing the position correction process; and
   the executing the position correction process during the update time window includes:
   controlling, in the unit time within the update time window, the target object to rotate by a preset quantity of the second unit correction amount.

9. The method according to claim 1, wherein the update time window corresponds to a time interval at which position information of the target object is received from the server.

10. The method according to claim 1, wherein the target object is displayed in a game application.

11. An apparatus, comprising:
    processing circuitry configured to:
    determine which position correction process to perform on a target object according to an update time window of a server, a motion state of the target object, and a position deviation of the target object, the position deviation being a difference between a first position of the target object in the server and a second position of the target object in a client of the apparatus, and the position correction process moving the target object from the second position to the first position being selected based on a comparison between the position deviation and a maximum displacement, the maximum displacement being determined based on the update time window of the server and the motion state of the target object; and execute the position correction process during the update time window to move the target object from the second position to the first position.

12. The apparatus according to claim 11, wherein the processing circuitry is configured to:
   determine a server time; and
   acquire the update time window according to the server time.

13. The apparatus according to claim 12, wherein the processing circuitry is configured to:
   receive network transmission delay information from the server, the network transmission delay information indicating a network transmission delay between the client and the server; and
   determine the server time according to a local time of the client and the network transmission delay information.

14. The apparatus according to claim 11, wherein the processing circuitry is configured to:
   acquire a total displacement of the target object within the update time window; and
   split the total displacement according to the update time window to obtain a first unit correction amount, the first unit correction amount being a displacement of the target object within a unit time when executing the position correction process; and
   control, in the unit time within the update time window, the target object to move by a preset quantity of the first unit correction amount.

15. The apparatus according to claim 11, wherein the motion state of the target object includes a speed and an acceleration of the target object, and the processing circuitry is configured to:
   acquire a first speed of the target object at a start time of the update time window;
   acquire a first time difference between a target time and the start time, the target time being after the start time within the update time window;
   acquire a maximum acceleration of the target object, the maximum acceleration being a preset value;
   acquire the maximum displacement of the target object within the update time window according to the first speed, the first time difference, and the maximum acceleration; and
   acquire the total displacement according to a size relationship between the maximum displacement and the position deviation.

16. The apparatus according to claim 15, wherein the processing circuitry is configured to:
   count, by using the maximum displacement as the total displacement, a difference between the position deviation and the maximum displacement into a position deviation for position correction in a next update time window when the maximum displacement is less than the position deviation;
   use a distance of the position deviation as the total displacement of the target object within the update time window when the maximum displacement is equal to the position deviation; or
   use a distance of the position deviation as the total displacement of the target object within the update time window when the maximum displacement is greater than the position deviation;
   acquire a second speed of the target object at an end time of the update time window according to the first speed, the first time difference, and the maximum acceleration; and
   use the second speed as a speed of the target object at a start time of the next update time window.

17. The apparatus according to claim 11, wherein the motion state of the target object includes a preset first operation, and the processing circuitry is configured to:
   directly change the target object from the second position to the first position according to the first operation.

18. The apparatus according to claim 11, wherein the motion state of the target object includes a motion direction of the target object, and the processing circuitry is configured to:
   acquire a target motion direction and an actual motion direction of the target object;
   acquire a rotation angle of the target object according to the target motion direction and the actual motion direction;
   split the rotation angle according to the update time window to obtain a second unit correction amount, the second unit correction amount being a rotation amount of the target object within a unit time when executing the position correction process; and
   control, in the unit time within the update time window, the target object to rotate by a preset quantity of the second unit correction amount.

19. The apparatus according to claim 11, wherein the update time window corresponds to a time interval at which position information of the target object is received from the server.

20. A non-transitory computer-readable storage medium storing instructions which when executed by a processor cause the processor to perform:
   determining which position correction process to perform on a target object according to an update time window of a server, a motion state of the target object, and a position deviation of the target object, the position deviation being a difference between a first position of the target object in the server and a second position of the target object in a client, and the position correction process moving the target object from the second position to the first position being selected based on a comparison between the position deviation and a maximum displacement, the maximum displacement being determined based on the update time window of the server and the motion state of the target object; and
   executing the position correction process during the update time window to move the target object from the second position to the first position.

* * * * *